United States Patent
Hungrige et al.

(10) Patent No.: US 6,998,435 B1
(45) Date of Patent: Feb. 14, 2006

(54) AQUEOUS ADHESIVE COMPOSITION

(75) Inventors: Thomas Hungrige, East Brunswick, NJ (US); Larry Uy, Valley Stream, NY (US); Danilo Go-pinas, Bellrose, NY (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 10/277,412

(22) Filed: Oct. 22, 2002

(51) Int. Cl.
*C08J 3/05* (2006.01)
*C08L 33/08* (2006.01)

(52) U.S. Cl. .................. 524/501; 524/515; 524/521; 524/522; 524/523; 524/524

(58) Field of Classification Search ............... 524/501, 524/522, 523, 515, 521, 524
See application file for complete search history.

(56) References Cited

U.S. PATENT DOCUMENTS

| | | | |
|---|---|---|---|
| 3,649,581 A | | 3/1972 | Mast et al. |
| 3,725,328 A | * | 4/1973 | Bowell et al. ............ 524/560 |
| 3,922,419 A | | 11/1975 | Hammer et al. |
| 4,154,711 A | | 5/1979 | Gandurin et al. |
| 4,160,750 A | | 7/1979 | Columbus et al. |
| 4,336,166 A | | 6/1982 | Penczuk et al. |
| 4,374,894 A | | 2/1983 | Antlfinger |
| 4,384,096 A | * | 5/1983 | Sonnabend ............ 526/313 |
| 4,397,984 A | | 8/1983 | Wendel et al. |
| 4,983,656 A | | 1/1991 | Ito et al. |
| 5,049,416 A | | 9/1991 | Wilczynski |
| 5,049,608 A | * | 9/1991 | Medina ............... 524/375 |
| 5,094,912 A | | 3/1992 | Deibig et al. |
| 5,229,447 A | | 7/1993 | Miyajima et al. |
| 5,346,738 A | * | 9/1994 | Samonides ............ 428/40.2 |
| 6,020,062 A | * | 2/2000 | Questel et al. ......... 428/354 |
| 6,066,688 A | * | 5/2000 | Samonides, Sr. ....... 524/272 |

FOREIGN PATENT DOCUMENTS

| | | |
|---|---|---|
| CA | 1 103 099 | 6/1981 |
| CA | 2 172 237 | 12/1996 |
| DE | 21 07 651 | 9/1971 |
| DE | 21 35 073 | 2/1973 |
| DE | 31 30 992 | 8/1981 |
| DE | 41 26 230 | 2/1993 |
| DE | 195 21 564 | 1/1997 |
| EP | 0 048 950 | 4/1982 |
| EP | 0 058 382 | 10/1983 |
| EP | 0 316 676 | 5/1989 |
| EP | 0 770 655 | 5/1997 |
| FR | 2791694 | 10/2000 |
| GB | 1393374 | 5/1995 |
| RU | 2 081 145 | 6/1997 |
| WO | WO93/3111 | 2/1993 |

OTHER PUBLICATIONS

Database WPI, Class A14, AN98-075499 XP002090131.
Patent Abstracts of Japan, vol. 010, No. 013.
Patent Abstracts of Japan, vol. 014, No. 280.
Patent Abstracts of Japan, vol. 015, No. 512.
Patent Abstracts of Japan, vol. 017, No. 030.
Patent Abstracts of Japan, vol. 017, No. 154.
Patent Abstracts of Japan, vol. 096, No. 007.
Lomalabel:haftklebendes Etikettenmaterial, das sich in Wasser auflost, XP002093881.
Anon: Losemittel: Wasser, XP003093880.
U.S. Appl. No.: 09/530,379.
International Application No. PCT/EP 98/06594 (U.S. Appl. No.: 09/530,379).

* cited by examiner

*Primary Examiner*—Judy M. Reddick
(74) *Attorney, Agent, or Firm*—Stephen D. Harper; Michael E. Carmen

(57) ABSTRACT

An aqueous adhesive composition is provided which comprises a major amount by weight of an aqueous acrylate emulsion having a viscosity of about 500 centipoise (cps) to about 10,000 cps at a temperature ranging from about 15° C. to about 45° C. and a minor amount by weight of a thickener for the adhesive composition which is an aqueous acrylic emulsion containing carboxylate groups and having a viscosity of at least 100,000 cps at a temperature ranging from about 25° C. to about 45° C. composition. The adhesive is particularly useful in the labelling of water-permeable hydrophilic substrates such as paper labels to non-treated plastic surfaces particularly plastics such as polystyrene, polycarbonate, polyvinyl chloride, and polyethylene terephthalate.

16 Claims, No Drawings

AQUEOUS ADHESIVE COMPOSITION

BACKGROUND OF THE INVENTION

1. Field of the Invention

This invention relates generally to an aqueous adhesive composition comprising a major amount by weight of an aqueous acrylate emulsion and a minor amount by weight of a thickener for the adhesive composition which is an aqueous acrylic emulsion containing carboxylate groups and to its use for bonding paper to plastic surfaces.

2. Description of Related Art

Adhesive compositions for use in applying labels to plastic articles are known. These adhesive compositions typically contain a starch-containing material to sufficiently thicken the adhesive composition. However, the use of a starch-containing material in an adhesive composition has been found to distinctly reduce the adhesion of a substrate on plastic surfaces and particularly non-treated plastic surfaces.

Accordingly, the problem addressed by the present invention was to develop an aqueous adhesive composition which would develop high adhesive strengths in the bonding of a water-permeable hydrophilic substrate to non-treated plastic surfaces.

SUMMARY OF THE INVENTION

In accordance with the present invention, an aqueous adhesive composition is provided which comprises a major amount by weight of an aqueous acrylate emulsion having a viscosity (Brookfield) of about 500 centipoise (cps) to about 10,000 cps at a temperature ranging from about 15° C. to about 45° C. and a minor amount by weight of a thickener for the adhesive composition which is an aqueous acrylic emulsion containing carboxylate groups and having a viscosity (Brookfield) of at least about 100,000 cps at a temperature ranging from about 25° C. to about 50° C.

Further in accordance with the present invention, a method of bonding a water-permeable hydrophilic substrate to a plastic surface is provided which comprises the steps of:
(a) providing an aqueous adhesive composition comprising a major amount by weight of an aqueous acrylate emulsion having a viscosity (Brookfield) of about 500 cps to about 10,000 cps at a temperature ranging from about 15° C. to about 45° C. and a minor amount by weight of a thickener for the adhesive composition which is an aqueous acrylic emulsion containing carboxylate groups and having a viscosity (Brookfield) of at least about 100,000 cps at a temperature ranging from about 25° C. to about 50° C.;
(b) applying the adhesive composition to at least a portion of the water-permeable hydrophilic substrate to provide a coated substrate; and,
(c) contacting the plastic surface with the coated substrate.

Yet further in accordance with the present invention, a plastic-containing article of manufacture is provided which comprises:
a water-permeable hydrophilic substrate;
a plastic-containing article of manufacture having at least one plastic-containing surface; and
an aqueous adhesive composition for bonding the water-permeable hydrophilic first substrate to the plastic-containing surface of the second substrate, the aqueous adhesive composition sandwiched between the first substrate and the second substrate and comprising a major amount by weight of an aqueous acrylate emulsion having a viscosity (Brookfield) of about 500 cps to about 10,000 cps at a temperature ranging from about 15° C. to about 45° C. and a minor amount by weight of a thickener for the adhesive composition which is an aqueous acrylic emulsion containing carboxylate groups and having a viscosity (Brookfield) of at least about 100,000 cps at a temperature ranging from about 25° C. to about 50° C.

In a preferred embodiment, a non-treated plastic-containing article of manufacture is provided which comprises:
a water-permeable hydrophilic substrate;
a second substrate having a non-treated plastic-containing surface; and
an aqueous adhesive composition substantially free of any starch-containing material and for bonding the water-permeable hydrophilic first substrate to the non-treated plastic-containing surface of the second substrate, the aqueous adhesive composition sandwiched between the first substrate and the second substrate and comprising a major amount by weight of an aqueous acrylate emulsion having a viscosity (Brookfield) of about 500 cps to about 10,000 cps at a temperature ranging from about 15° C. to about 45° C. and a minor amount by weight of a thickener for the adhesive composition which is an aqueous acrylic emulsion containing carboxylate groups and having a viscosity (Brookfield) of at least about 100,000 cps at a temperature ranging from about 25° C. to about 50° C.

By forming the foregoing aqueous adhesive composition, particularly in the substantial absence of any starch-containing material, the ability to bond a water-permeable hydrophilic substrate to a plastic surface of a plastic-containing article is achieved and particularly in the case of a non-treated plastic surface of the article. These and other advantages will be readily apparent to those skilled in the art based upon the disclosure contained herein.

The expression "an aqueous adhesive composition substantially free of any starch-containing material" as used herein shall be understood to mean an aqueous adhesive composition formed in the presence of little to no starch-containing material. In this manner, the amount of any starch-containing material, if present, in the aqueous adhesive composition must be controlled such that the bonding of the water-permeable hydrophilic substrate to a non-treated plastic surface of a plastic-containing article is not adversely affected to a significant extent. Accordingly, this is achieved when the starch-containing material is present in the aqueous adhesive composition in relatively small amounts, e.g., no more than about 10 weight percent, preferably no more about 1 weight percent and most preferably 0 weight percent.

The expression "starch-containing material" as used herein is applicable to materials which have been formed with starch and include, by way of example, native starches, degraded starches, chemically modified starches, starch derivatives, etc.

The expression "non-treated plastic surface" shall be understood to mean a surface of a plastic substrate that has not been treated in any manner to increase the hydrophilic character of the surface such as by flame treatment, electrostatic methods, Corona discharge methods, oxidation or the like.

DESCRIPTION OF THE PREFERRED EMBODIMENTS

As a first component of the aqueous adhesive composition of the present invention is a major amount by weight of an aqueous acrylate emulsion having a viscosity (Brookfield) of about 500 cps to about 10,000 cps, preferably from about 800 cps to about 7,500 cps and most preferably from about 1,000 cps to about 5,000 cps at a temperature ranging from about 15° C. to about 45° C. The aqueous acrylate emulsions are based on an acrylate copolymer derived from the copolymerization in an aqueous medium, e.g., water, and under emulsion copolymerization conditions known in the art, of an alkyl acrylate having from 2 to about 20 carbon atoms and more preferably from 4 to about 12 carbon atoms with one or more other comonomers. In general, the foregoing aqueous acrylate emulsion will have a pH of from about 7 to about 10, preferably from about 7.8 to about 9 and most preferably from about 8 to about 8.7 and will have a glass transition temperature ($T_g$) of less than about 0° C., preferably less than about −10° C. and most preferably less than about −25° C. The total solids content of the aqueous acrylate emulsion is in the range from about 30 to about 70% by weight and preferably in the range from about 40 to 60% by weight, based on the emulsion.

Suitable alkyl acrylates for use herein include, but are not limited to, ethyl acrylate, butyl acrylate, 2-ethylhexyl acrylate, octyl acrylate, ethyleneglycol dimethacrylate, diethylene glycol diacrylate, cyanoethyl acrylate, methyl methacrylate, butyl methacrylate and hydroxypropyl methacrylate. Suitable comonomers include, but are not limited to, α,β-olefinically unsaturated carboxylic acids containing 3 to 5 carbon atoms, e.g., acrylic, methacrylic, ethacrylic and cyanoacrylic acids; monounsaturated dicarboxylic acids containing 4 to 8 carbon atoms, e.g., fumaric and maleic acids; esters of α,β-olefinically unsaturated carboxylic acids containing 3 to 5 carbon atoms and monounsaturated dicarboxylic acids containing 1 to about 20 and preferably 4 to about 12 carbon atoms, such as methyl acrylate, ethyl acrylate, butyl acrylate, 2-ethylhexyl acrylate, octyl acrylate, ethyleneglycol dimethacrylate, diethylene glycol diacrylate, cyanoethyl acrylate, methyl methacrylate, butyl methacrylate, hydroxypropyl methacrylate, ethyl maleate, butyl fumarate, maleic dimethyl ester, maleic acid mono-(2-ethylhexyl)ester, fumaric acid diethyl ester, and fumaric acid dilauryl ester; α,β-olefinically unsaturated nitriles containing 3 to 5 carbon atoms, e.g., acrylonitrile and methacrylonitrile; vinyl ethers containing 4 to about 22 carbon atoms, e.g., ethyl vinyl ether, chloroethyl vinyl ether, isobutyl vinyl ether, cetyl vinyl ether, and lauryl vinyl ether; vinyl ketones containing 3 to about 12 carbon atoms, e.g., methyl vinyl ketone; vinyl esters of carboxylic acids containing 4 to about 22 carbon atoms, e.g., vinyl acetate, vinyl propionate, vinyl formate, vinyl stearate, vinyl benzoate, and vinyl and allyl chloroacetate; aromatic vinyl compounds, e.g., styrene, α-methyl styrene and vinyl toluene, α-olefins containing 2 to about 12 carbon atoms, e.g., ethylene, propylene, isobutylene, and butene-1; and the like.

In general, the foregoing aqueous acrylate emulsion is employed in a major amount by weight of the aqueous adhesive composition of this invention, e.g., in amounts ranging from about 40 to about 99, preferably from about 55 to about 90 and most preferably from 75 to about 85 weight percent.

As a second component of the aqueous adhesive composition of the present invention is a minor amount by weight of a thickener for the adhesive composition which is an aqueous acrylic emulsion containing carboxylate groups and having a viscosity (Brookfield) of at least about 1,000,000 cps, preferably at least about 600,000 cps and most preferably at least about 100,000 at a temperature ranging from about 25° C. to about 50° C. The aqueous acrylic emulsions are based on an acrylic copolymer having carboxylic acid groups derived from the copolymerization in an aqueous medium, e.g., water, and under emulsion copolymerization conditions known in the art, of an acrylic monomer having carboxylic acid groups, e.g., acrylic, methacrylic, ethacrylic and cyanoacrylic acids, with one or more other comonomers which may or may not have carboxylic acid groups followed by neutralization to form the carboxylate groups. Suitable comonomers include, but are not limited to, monounsaturated dicarboxylic acids containing 4 to 8 carbon atoms, e.g., fumaric and maleic acids; esters of α,β-olefinically unsaturated carboxylic acids containing 3 to 5 carbon atoms and monounsaturated dicarboxylic acids containing 1 to about 20 and preferably 4 to about 12 carbon atoms, e.g., methyl acrylate, ethyl acrylate, butyl acrylate, 2-ethylhexyl acrylate, octyl acrylate, ethyleneglycol dimethacrylate, diethylene glycol diacrylate, cyanoethyl acrylate, methyl methacrylate, butyl methacrylate, hydroxypropyl methacrylate, ethyl maleate, butyl fumarate, maleic dimethyl ester, maleic acid mono-(2ethylhexyl)ester, fumaric acid diethyl ester, and fumaric acid dilauryl ester; α,β-olefinically unsaturated nitriles containing 3 to 5 carbon atoms, e.g., acrylonitrile and methacrylonitrile; vinyl ethers containing 4 to 22 carbon atoms, e.g., ethyl vinyl ether, chloroethyl vinyl ether, isobutyl vinyl ether, cetyl vinyl ether, and lauryl vinyl ether; vinyl ketones containing 3 to about 12 carbon atoms, e.g., methyl vinyl ketone; vinyl esters of carboxylic acids containing 4 to about 22 carbon atoms, e.g., vinyl acetate, vinyl propionate, vinyl formate, vinyl stearate, vinyl benzoate, and vinyl and allyl chloroacetate; aromatic vinyl compounds, e.g., styrene, α-methyl styrene and vinyl toluene, α-olefins containing 2 to about 12 carbon atoms, e.g., ethylene, propylene, isobutylene, and butene-1; and the like.

When forming the aqueous adhesive composition of the present invention, the aqueous acrylic emulsion having carboxylic acid groups will have a viscosity (Brookfield) of about 10 cps to about 10,000 cps, preferably at least about 25 cps to about 5000 cps and most preferably about 50 to about 1,500 at a temperature ranging from about 15° C. to about 45° C. and can first be neutralized to form carboxylate groups and then added to the aqueous acrylate emulsion or neutralization can be carried out when the aqueous acrylic emulsion is added to the aqueous acrylate emulsion. In general, the aqueous acrylic emulsion having carboxylic acid groups can be neutralized with a non-volatile base such as an alkali metal hydroxide, e.g., sodium hydroxide or potassium hydroxide, or a non-volatile amine, e.g., triethanolamine. Alternatively, it may be appropriate to neutralize the aqueous acrylic emulsion with a volatile base such as, for example ammonia, or a volatile amine. As one skilled in the art would readily appreciate, the use of a volatile base advantageously provides an adhesive bond having improved water resistance. Neutralization will be carried until the pH of the aqueous acrylic emulsion containing carboxylate groups is from about 6.7 to about 9 and preferably from about 7 to about 8 such that the aqueous acrylic emulsion is a clear emulsion and will possess a viscosity (Brookfield) of at least about 1,000,000 cps, preferably at least about 600,000 cps and most preferably at least about 100,000 at a temperature ranging from about 25° C. to about 50° C.

Generally, the aqueous acrylic emulsion will have a glass transition temperature ($T_g$) of less than about 40° C., preferably less than about 35° C. and most preferably less than about 30° C. The total solids content of the aqueous acrylate emulsion is in the range from about 30 to about 70% by weight and preferably in the range from about 40 to 60% by weight, based on the emulsion.

The adhesives of the present invention is prepared in known manner by mixing the components at room temperature or at a temperature ranging from about 25 to about 85° C. In general, the foregoing aqueous acrylic emulsion will be mixed with the foregoing aqueous acrylate emulsion in a minor amount sufficient to thicken the aqueous adhesive composition and a translucent homogeneous dispersion is obtained such that the final aqueous adhesive composition will have a viscosity (Brookfield) ranging from about 20,000 cps to about 400,000 cps and preferably from about 40,000 cps to about 250,000 cps at a temperature of 40° C. Amounts of the aqueous acrylic emulsion having carboxylate groups will ordinarily range from about 1 to about 30, preferably from about 10 to about 20 and most preferably from 14 to about 18 weight percent. Additionally, the final aqueous adhesive composition will have a pH ranging from about 7.5 to about 10 and preferably from about 8.5 to about 9. The total solids content of the adhesives according to the invention is in the range from about 25 to about 75% by weight and preferably in the range from about 30 to 65% by weight, based on the final adhesive.

The aqueous adhesive composition of this invention can also include optional components such as, for example, acrylamides derived from acrylic and methacrylic acids and their N-alkylol and N-alkoxyalkyl derivatives containing 3 to 20 and preferably 4 to 12 carbon atoms, such as acrylamide itself, N-methylol acrylamide, N-butoxy methacrylamide, methylenebisacrylamide, methacrylamide, N-octyl acrylamide, diacetone acrylamide, and hydroxymethyl diacetone acrylamide. Additionally, the adhesives according to the invention may contain other additives to obtain special properties, for example, in regard to solubility, storage life, processing properties, color and the like. These additives are generally used in amounts of no more than 10 percent by weight and preferably from about 0.01 to about 4 weight percent. Thus, benzoates, fluorides, e.g., sodium fluoride, amidic substances and hydroxybenzoic acid esters, e.g. p-hydroxybenzoic methyl ester or butyl ester, in amounts of from about 0.2 to about 0.6 weight percent are advantageously used as preservative. Suitable antifoam agents include stearates, silicone oil and addition products of ethylene oxide or propylene oxide with fatty alcohols containing from about 12 to about 22 carbon atoms in amounts of from about 0.3 to about 2.5 weight percent. The flow properties of the adhesive can be controlled in known manner by the addition of certain water-soluble low molecular weight liquifying agents, more particularly urea, thiourea and/or dicyanodiamide and also inorganic or organic salts, such as halides, nitrates, sulfates, etc. Substances such as these are best used in a concentration of 0 to about 5 weight percent and preferably in a concentration of about 0.5 to about 3 weight percent. If desired, other suitable additives such as fragrances, dyes or fillers and also surfactants as wetting agents can be included.

The aqueous adhesive compositions according to the invention is suitable for bonding water-permeable hydrophilic substrates to plastic surfaces and particularly for bonding paper labels to non-treated plastic surfaces of plastic-containing articles. Suitable water-permeable hydrophilic substrates include paper, films and the like with paper being preferred. The water-permeable hydrophilic substrates may also be coated with, for example, aluminium or a plastic film. Effective bonding presupposes adequate wetting of the plastic surface with the adhesive according to the invention. This is achieved in particular when the surface energy sigma amounts to at least about 33 dynes/cm to about 43 dynes/cm. Thus, bonds of such high strength are obtained with polystyrene, polycarbonate, polyvinyl chloride, polyethylene terephthalate that paper labels tear on removal. However, the adhesives according to the invention may also be used for other plastics, such as those treated in accordance with techniques known in the art, e.g., flame-treating or electrostatically treating techniques. Examples of treated plastics include polyethylene, high density polyethylene (HDPE), low density polyethylene (LDPE) and polypropylene.

The articles to be bonded may consist entirely of plastic, for example, plastic containers, such as bottles, cans, buckets, beakers, etc. However, they may also have at least one plastic surface, with the rest of the article being formed from metal, glass or wood, e.g., tin cans, coated glass bottles, painted wood, etc. It is also contemplated that the water-permeable hydrophilic substrate can be applied to a non-coated glass as well as the coated glass bottles.

Generally, the aqueous adhesive composition of the present invention is applied to the water-permeable hydrophilic substrate at a wet film thickness ranging from about 0.1 mil to about 8.0 mils and preferably from about 0.5 mil to about 4 mils. Techniques for applying the adhesive to the substrate are known in the art, e.g., high speed rotary bottle labeler (available from such sources as Krones (Germany) and Anker (Germany)). The substrate is then applied to the plastic surface of the plastic-containing material under gentle pressure and allowed to stand at room temperature for a time period sufficient to allow the substrate to bond to the plastic surface, e.g., a time period ranging from about 5 minutes to about 24 hours.

The following non-limiting examples are illustrative of this invention.

EXAMPLE 1

In a mixing vessel, 16.65 weight percent of Eastarez 1030 (an aqueous acrylic emulsion available from Eastman Chemical, Kingsport, Tenn.) and 0.20 weight percent Foamaster VF defoamer (antifoam agent available from Cognis Corporation, Cincinnati, Ohio) was mixed slowly and heated to a temperature of 110° F. Next, 77.50 weight percent of Flexcryl 95 (an aqueous butyl acrylate emulsion available from Air Products, Allentown, Pa.), 0.65 weight percent dicyanamide and 1.10 weight percent potassium hydroxide was added and the pH was checked. An additional 0.20 weight percent of potassium hydroxide was added to bring the pH of the mixture up to a range of 8.5 to 9 and then 0.10 weight percent Tekamer 38AD biocide (preservative), 2.80 weight percent tetraethylene glycol, 0.70 weight percent Surfynol P-216 (defoaming wetting agent available from Air Products, Allentown, Pa.) and 0.10 weight percent Foamaster VF was added. The resulting aqueous adhesive composition was a yellowish translucent flowable material having a viscosity (Brookfield) of 70,000 to 120,0000 at 76° F., a pH of 8.4 to 8.8 and a solids content of 49 to 53 percent.

EXAMPLE 2

The aqueous adhesive composition of Example 1 was then applied to a paper label (product of Precision Printing and Packaging) by a rotary labeler in a layer thickness of approximately 4 mils. The label was then applied to non-pretreated plastic bottles PVC, PET, PETE, PC and PS under gentle pressure at room temperature. After storage for a time period of 10 minutes at room temperature an attempt was made to remove the label from the bottles but the labels tore.

Although the present invention has been described in preferred forms with a certain degree of particularity, many changes and variations are possible therein and will be apparent to those skilled in the art after reading the foregoing description. It is therefore to be understood that the present invention may be practiced otherwise than as specifically described herein without departing from the spirit and scope thereof.

What is claimed is:

1. An aqueous adhesive composition comprising a major amount by weight of an aqueous acrylate emulsion having a viscosity (Brookfield) of about 500 centipoise (cps) to about 10,000 cps at a temperature ranging from about 15° C. to about 45° C. and a minor amount by weight of a thickener for the adhesive composition which is an aqueous acrylic emulsion containing carboxylate groups and having a viscosity (Brookfield) of at least 100,000 cps at a temperature ranging from about 25° C. to about 50° C.

2. The aqueous adhesive composition of claim 1 wherein the aqueous acrylate emulsion is derived from the copolymerization in an aqueous medium and under emulsion copolymerization of an alkyl acrylate having from 2 to about 20 carbon atoms with one or more other comonomers.

3. The aqueous adhesive composition of claim 1 wherein the aqueous acrylate emulsion is derived from the polymerization of an acrylate selected from the group consisting of ethyl acrylate, butyl acrylate, 2-ethylhexyl acrylate, octyl acrylate, ethylene glycol dimethacrylate, diethylene glycol diacrylate, cyanoethyl acrylate, methyl methacrylate, butyl methacrylate, hydroxypropyl methacrylate and mixtures thereof with one or more other comonomers.

4. The aqueous adhesive composition of claim 2 wherein the comonomer is selected from the group consisting of $\alpha,\beta$-olefinically unsaturated carboxylic acids containing 3 to 5 carbon atoms, monounsaturated dicarboxylic acids containing 4 to 8 carbon atoms, esters of $\alpha,\beta$-olefinically unsaturated carboxylic acids containing 3 to 5 carbon atoms, esters of monounsaturated dicarboxylic acids containing 1 to 20 carbon atoms, $\alpha,\beta$-olefinically unsaturated nitrites containing 3 to 5 carbon atoms, vinyl ethers containing 4 to about 22 carbon atoms, vinyl ketones containing 3 to about 12 carbon atoms, vinyl esters of carboxylic acids containing 4 to about 22 carbon atoms, aromatic vinyl compounds and $\alpha$-olefins containing 2 to about 12 carbon atoms.

5. The aqueous adhesive composition of claim 1 wherein the glass transition temperature ($T_g$) of the aqueous acrylate emulsion is less than about 0° C.

6. The aqueous adhesive composition of claim 1 wherein the glass transition temperature ($T_g$) of the aqueous acrylate emulsion is less than about −10° C.

7. The aqueous adhesive composition of claim 1 wherein the aqueous acrylic emulsion is derived from the copolymerization in an aqueous medium and under emulsion copolymerization of an acrylic monomer having carboxylic acid groups with one or more other comonomers which may or may not have carboxylic acid groups followed by neutralization of the aqueous acrylic emulsion having carboxylic acid groups to form the aqueous acrylic emulsion having carboxylate groups.

8. The aqueous adhesive composition of claim 7 wherein the acrylic monomer having carboxylic acid groups is selected from the group consisting of acrylic acid, methacrylic acid, ethacrylic acid and cyanoacrylic acid.

9. The aqueous adhesive composition of claim 7 wherein the comonomer is selected from the group consisting of monounsaturated dicarboxylic acids containing 4 to 8 carbon atoms, esters of $\alpha,\beta$-olefinically unsaturated carboxylic acids containing 3 to 5 carbon atoms, esters of monounsaturated dicarboxylic acids containing 1 to about 20 carbon atoms, $\alpha,\beta$-olefinically unsaturated nitrites containing 3 to 5 carbon atoms, vinyl ethers containing 4 to 22 carbon atoms, vinyl ketones containing 3 to about 12 carbon atoms, vinyl esters of carboxylic acids containing 4 to about 22 carbon atoms, aromatic vinyl compounds, and $\alpha$-olefins containing 2 to about 12 carbon atoms.

10. The aqueous adhesive composition of claim 7 wherein the aqueous acrylic emulsion is neutralized with a non-volatile base or a volatile base.

11. The aqueous adhesive composition of claim 10 wherein the non-volatile base is an alkali metal hydroxide.

12. The aqueous adhesive composition of claim 10 wherein the volatile base is ammonium hydroxide or a volatile amine.

13. The aqueous adhesive composition of claim 1 wherein the major amount by weight of the aqueous acrylate emulsion is from about 40 to about 99 weight percent and the minor amount by weight of the aqueous acrylic emulsion is from about 1 to about 30 weight percent.

14. The aqueous adhesive composition of claim 1 having a viscosity (Brookfield) of from about 20,000 cps to about 400,000 cps at a temperature of 40° C. and a pH of from about 7.5 to about 10.

15. The aqueous adhesive composition of claim 1 having a total solids content of 25 to 75% by weight.

16. The aqueous adhesive composition of claim 1 which is substantially free of any starch-containing material.

* * * * *